United States Patent
Carter et al.

(10) Patent No.: US 10,020,988 B2
(45) Date of Patent: Jul. 10, 2018

(54) AUTO-CONFIGURATION OF WIRELESS NETWORK EXTENDER

(71) Applicant: ARRIS Enterprises, Inc., Suwanee, GA (US)

(72) Inventors: Wade E. Carter, Johns Creek, GA (US); Ali Negahdar, Duluth, GA (US); Kurt Alan Lumbatis, Dacula, GA (US); Angela Lyda, Atlanta, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 54 days.

(21) Appl. No.: 14/939,067

(22) Filed: Nov. 12, 2015

(65) Prior Publication Data

US 2016/0134469 A1   May 12, 2016

Related U.S. Application Data

(60) Provisional application No. 62/078,454, filed on Nov. 12, 2014.

(51) Int. Cl.
*H04L 12/28* (2006.01)
*H04L 12/24* (2006.01)
(Continued)

(52) U.S. Cl.
CPC ...... *H04L 41/0803* (2013.01); *H04L 63/0823* (2013.01); *H04W 12/04* (2013.01);
(Continued)

(58) Field of Classification Search
CPC ........ H04W 12/08; H04W 24/02; H04L 63/10
See application file for complete search history.

(56) References Cited

U.S. PATENT DOCUMENTS 8,131,209 B1 *   3/2012   Chen ................ H04B 7/15528
                                                370/315
9,497,197 B2 *   11/2016  Kus ......................... H04L 63/10
(Continued)

FOREIGN PATENT DOCUMENTS

EP   2378829 A1      10/2011
EP   2387264 A1      11/2011
EP   2640002 A1 *    9/2013   .......... H04L 41/0809

OTHER PUBLICATIONS

Presser, Alan et al., "UPnP™ Device Architecture 1.1", UpNP Forum, Document Revision Date: Oct. 15, 2008.
(Continued)

*Primary Examiner* — Hanh N Nguyen
(74) *Attorney, Agent, or Firm* — Bart A. Perkins

(57) ABSTRACT

Methods, systems, and computer readable media may be operable to facilitate the automatic configuration of a network extender with network parameters. An access point may identify a network extender and may determine whether the identified network extender is configured for an automatic configuration of network parameters based upon device description information retrieved during the identification of the network extender. The access point may output a configuration message to the identified network extender, the configuration message including one or more parameters associated with a network provided by the access point, and the network extender may apply the one or more parameters. The access point may periodically or conditionally provide the network extender with updates to the network parameters.

13 Claims, 7 Drawing Sheets

(51) Int. Cl.
*H04W 76/14* (2018.01)
*H04W 12/04* (2009.01)
*H04L 29/06* (2006.01)
*H04W 16/26* (2009.01)
*H04W 12/06* (2009.01)
*H04W 84/04* (2009.01)
*H04W 84/12* (2009.01)
*H04W 92/20* (2009.01)

(52) U.S. Cl.
CPC ........... *H04W 16/26* (2013.01); *H04W 76/14* (2018.02); *H04W 12/06* (2013.01); *H04W 84/047* (2013.01); *H04W 84/12* (2013.01); *H04W 92/20* (2013.01)

(56) References Cited

U.S. PATENT DOCUMENTS

| | | | |
|---|---|---|---|
| 2005/0159823 A1 | 7/2005 | Hayes et al. | |
| 2005/0251403 A1* | 11/2005 | Shuey | G06Q 50/06 705/412 |
| 2006/0039360 A1* | 2/2006 | Thawani | H04W 8/20 370/352 |
| 2010/0165910 A1* | 7/2010 | Mathews | H04B 7/15528 370/315 |
| 2011/0077790 A1* | 3/2011 | Vaswani | G01D 4/004 700/291 |
| 2011/0274029 A1* | 11/2011 | Connelly | H04W 24/02 370/315 |
| 2012/0008529 A1* | 1/2012 | Averbuch | H04L 41/0806 370/255 |
| 2012/0230491 A1* | 9/2012 | Duo | H04W 48/16 380/270 |
| 2013/0103855 A1* | 4/2013 | Wang | H04L 41/0809 709/245 |
| 2014/0071883 A1* | 3/2014 | Abraham | H04B 7/14 370/315 |
| 2014/0134991 A1* | 5/2014 | Walker | H04W 24/02 455/418 |
| 2014/0247941 A1* | 9/2014 | Gu | H04L 63/062 380/270 |
| 2015/0358830 A1* | 12/2015 | Bajko | H04W 48/14 370/254 |
| 2016/0037564 A1* | 2/2016 | Borden | H04W 12/08 370/254 |
| 2016/0080128 A1* | 3/2016 | Hebron | H04L 5/0055 370/328 |
| 2016/0269183 A1* | 9/2016 | Cherian | H04W 12/06 |

OTHER PUBLICATIONS

Lawrence, Scott, "UPnP Basic: Device Template Version 1.01", for UPnP™ Version 1.0, Dec. 12, 2002.
PCT Search Report & Written Opinion, Re: Application No. PCT/US2015/060290; dated Feb. 15, 2016.

* cited by examiner

AUTO-CONFIGURATION OF WIRELESS NETWORK EXTENDER

CROSS REFERENCE TO RELATED APPLICATION

This application is a non-provisional application claiming the benefit of U.S. Provisional Application Ser. No. 62/078,454, entitled "Autoconfiguration of Home Network Extender," which was filed on Nov. 12, 2014, and is incorporated herein by reference in its entirety.

TECHNICAL FIELD

This disclosure relates to the configuration of wireless network extenders.

BACKGROUND

Typically, an access point such as a gateway device may provide a plurality of services to a customer premise, and the plurality of services may be provided through wireless communications passed between the access point and one or more client devices or stations. The delivery of wireless communications between an access point and a client device may be limited by the strength of a signal existing between the access point and a client device. For example, distance, obstacles, signal type, and radio transmit power may affect the delivery of wireless communications between an access point and client device.

One or more network extenders (e.g., Wireless Ethernet Coax Bridge (WECB)) may be installed within a customer premise to expand the range of a wireless network that is provided by an access point. However, installation of the one or more network extenders typically requires that a user, installer, or technician manually configure each network extender with wireless network parameters (e.g., service set identifier (SSID) information) that are applied at the access point. Moreover, various security measures (e.g., passwords/passphrases, encryption keys, etc.) may need to be overcome in order to enable a network extender to communicate with an access point. Further, each time that an update to network parameter(s) is made at the access point, the update(s) must be repeated at some or all of the network extenders associated with the access point. Therefore, it is desirable to improve upon methods, systems and apparatuses for configuring a network extender with wireless network parameters.

BRIEF DESCRIPTION OF THE DRAWINGS

Like reference numbers and designations in the various drawings indicate like elements.

DETAILED DESCRIPTION

Figure 1:
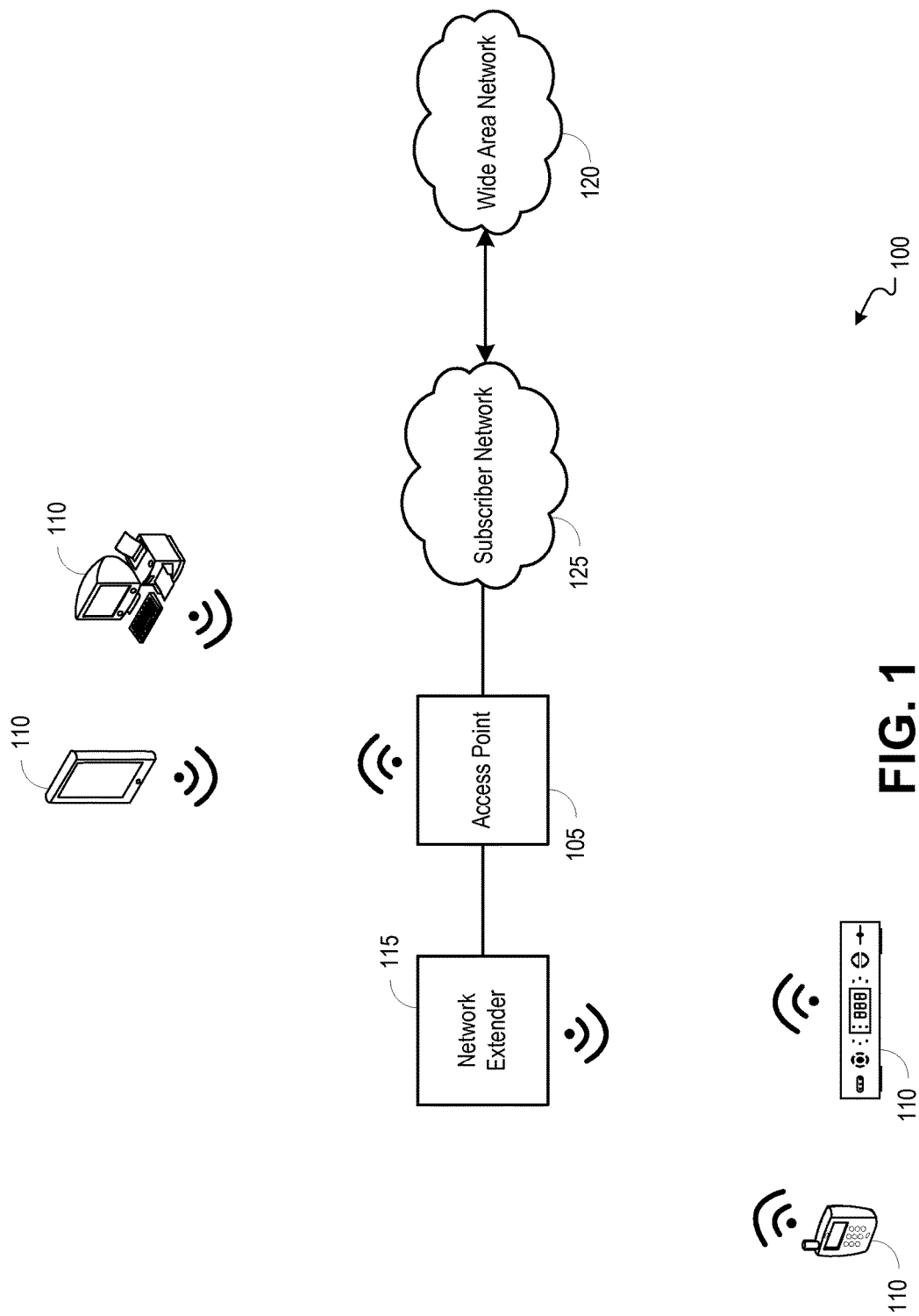
FIG. 1 is a block diagram illustrating an example network environment operable to facilitate the automatic configuration of a network extender with wireless network parameters.

Methods, systems, and computer readable media may be operable to facilitate the automatic configuration of a network extender with network parameters. An access point may identify a network extender and may determine whether the identified network extender is configured for an automatic configuration of network parameters based upon device description information retrieved during the identification of the network extender. The access point may output a configuration message to the identified network extender, the configuration message including one or more parameters associated with a network provided by the access point, and the network extender may apply the one or more parameters. The access point may periodically or conditionally provide the network extender with updates to the network parameters.

An embodiment of the invention described herein may include a method for configuration of a network extender by an access point, the method comprising: (a) receiving a message from the network extender, wherein the message identifies the network extender to the access point; (b) determining a network location of a server associated with the network extender; (c) establishing a connection between the access point and the server associated with the network extender; and (d) outputting a configuration message to the server associated with the network extender, wherein the configuration message comprises one or more network parameters.

According to an embodiment of the invention, the message received from the network extender comprises an advertisement message.

According to an embodiment of the invention, the method described herein further comprises: (a) outputting a search message from the access point; and (b) wherein the message received from the network extender comprises a search response message.

According to an embodiment of the invention, the method described herein further comprises: (a) retrieving device description information associated with the network extender; and (b) determining that the network extender supports automatic configuration based upon a comparison of the device description information associated with the network extender to device description information identifying one or more devices that support automatic configuration.

According to an embodiment of the invention, the method described herein further comprises: (a) receiving a digital certificate associated with the network extender; and (b) authenticating the digital certificate associated with the network extender using a root certificate stored at the access point.

According to an embodiment of the invention, the one or more network parameters comprise parameters associated with one or more service sets that are configured at the access point.

According to an embodiment of the invention, the one or more network parameters comprise parameters that, when applied at the network extender, allow the network extender to pass communications between a client device and the access point.

According to an embodiment of the invention, the method described herein further comprises: (a) wherein the access point does not receive an acknowledgement message from the network extender in response to the output of the configuration message; and (b) outputting one or more subsequent configuration messages to the server associated with the network extender.

According to an embodiment of the invention, the method described herein further comprises: (a) receiving an update to one or more network parameters at the access point; and (b) outputting a subsequent configuration message to the server associated with the network extender, wherein the subsequent configuration message comprises the updated one or more network parameters.

An embodiment of the invention described herein may include an apparatus comprising: (a) an interface configured to be used to receive a message identifying a network extender; (b) one or more modules configured to: (i) determine a network location of a server associated with the network extender; and (ii) establish a connection with the server associated with the network extender; and (c) an interface configured to be used to output a configuration message to the server associated with the network extender, wherein the configuration message comprises one or more network parameters.

An embodiment of the invention described herein may include one or more non-transitory computer readable media having instructions operable to cause one or more processors to perform the operations comprising: (a) receiving a message from a network extender, wherein the message identifies the network extender to an access point; (b) determining a network location of a server associated with the network extender; (c) establishing a connection between the access point and the server associated with the network extender; and (d) outputting a configuration message to the server associated with the network extender, wherein the configuration message comprises one or more network parameters.

FIG. 1 is a block diagram illustrating an example network environment 100 operable to facilitate the automatic configuration of a network extender with wireless network parameters. In embodiments, an access point 105 may route communications to and from one or more client devices 110. For example, the one or more client devices 110 may be provisioned to receive video service(s), data service(s), and/or voice services through the access point 105. In embodiments, an access point 105 may include a gateway, a cable modem, a wireless router including an embedded cable modem, a mobile hot-spot router, a multimedia over coaxial alliance (MoCA) node, and any other device that is operable to route communications to and from a client device 110.

In embodiments, client devices 110 may include a wide variety of devices such as televisions, mobile devices, tablets, set-top boxes, computers, and any other device that is capable of utilizing a video, data, or telephony service. In embodiments, an access point 105 may provide one or more service sets, and the service sets may be identified using unique service set identifiers (SSID). Service sets may be used for delivering traffic between a client device 110 and the access point 105, and each service set may be designated for a particular service (e.g., video, data, security, hotspot, etc.). In embodiments, the client devices 110 may identify a service set and may connect to a service set provided by the access point 105.

In embodiments, a network extender 115 may be associated with an access point 105, and the network extender 115 may facilitate the delivery of multiple services to client devices 110. The network extender 115 may be configured with network parameters of the associated access point 105, thereby extending the range of a wireless network provided by the access point 105. For example, the network extender 115 may be configured with SSID(s), passwords/passphrases, and various other wireless parameter information associated with the access point 105. It will be appreciated by those skilled in the relevant art that a channel of communication may be established between the access point 105 and a network extender 115 using any of a variety of communication technologies (e.g., MoCA, 802.11, G.hn, HomePlug AV (HPAV), HPAV2, Bluetooth, Zigbee, Zwave, etc.).

Once connected to a service set provided by the access point 105 or network extender 115, a client device 110 may receive content and/or services from upstream networks or servers (e.g., wide area network (WAN) 120), and may communicate with other client devices 110 connected to the same service set. For example, communications between client devices 110 and an access point 105 or network extender 115 may include wireless communications (e.g., 802.11 packet exchanges).

In embodiments, an access point 105 may route communications between client device(s) 110 and a wide area network (WAN) 120 via a subscriber network 125. The subscriber network 125 may include various networks such as coaxial cable, optical fiber, twisted pair network, wireless networks including 4G and LTE, and others.

In embodiments, one or more network extenders 115 may be connected to an access point 105 via a multimedia over coax alliance (MoCA) connection or any other physical medium used for communication (e.g., MoCA, 802.11, G.hn, HomePlug AV (HPAV), HPAV2, Bluetooth, Zigbee, Zwave, etc.). The access point 105 may create one or more virtual local area networks (VLAN) over a MoCA interface to correspond with service set identifiers (SSID) (e.g., private SSID, Ethernet, etc.) at the one or more network extenders. The access point 105 may maintain a record identifying device(s) associated with each of the one or more network extenders.

In embodiments, an access point 105 may automatically configure a network extender 115. The access point 105 may identify a network extender 115. For example, the access point 105 may receive a discovery message from a network extender 115. The discovery message may be an advertisement message output from the network extender 115 or a search response message output from the network extender 115 in response to receiving a search message from the access point 105.

In embodiments, the discovery message may include device description information (e.g., network location such as uniform resource locator (URL), device type, manufacturer, model number, etc.) associated with the network extender 115, and the access point 105 may use the device description information to determine whether the network extender 115 is configured for automatic configuration through the access point 105. A network location received within the discovery message may identify a local or internal location at the network extender 115.

In embodiments, the device description information associated with the network extender 115 may be used by the access point 105 to establish a secure layer (e.g., HTTP-S) session with the network extender 115. The access point 105 may receive a digital certificate from the network extender 115, and the access point 105 may authenticate the digital certificate against a root certificate.

The access point 105 may output a parameter configuration message to the network extender 115. For example, the parameter configuration message may be a HTTP-S PUT request that is output to the network location (e.g., URL) associated with the network extender 115, and the HTTP-S PUT may include network parameter attributes such as configuration version, wireless mode, radio status, output power, beacon interval, service set identifier (SSID) information and others. It should be understood that the network location may be a local or internal location at the network extender 115.

In embodiments, the network extender 115 may apply network parameter attributes included within the parameter configuration message that is received from the access point 105. For example, the network extender 115 may cache and store these network parameter attributes in non-volatile memory to preserve the network parameter attributes over a reboot. The network extender 115 may ignore any of the received network parameter attributes that are not applicable to or not understood by the network extender 115 (e.g., attributes not applicable to or not understood by the network extender 115 will not be treated as an HTTP PUT failure). If the network parameter attributes are successfully received and provisioned at the network extender 115, the network extender 115 may output an acknowledgement message (e.g., '201 Created') to the access point 105.

In embodiments, where an access point 105 comprises only a single radio (e.g., 2.4 GHz radio), and a network extender 115 installed in a premise comprises multiple radios (e.g., 2.4 GHz radio and 5 GHz radio), multiple radio settings (e.g., radio settings for the 5 GHz radio) may be provisioned at the access point 105 via a MIB setting or alternative configuration method. The access point 105 may then use the multiple radio provisioning to pass configuration settings associated with the additional radio (e.g., 5 GHz radio) to the multi-radio network extender 115.

Figure 2:
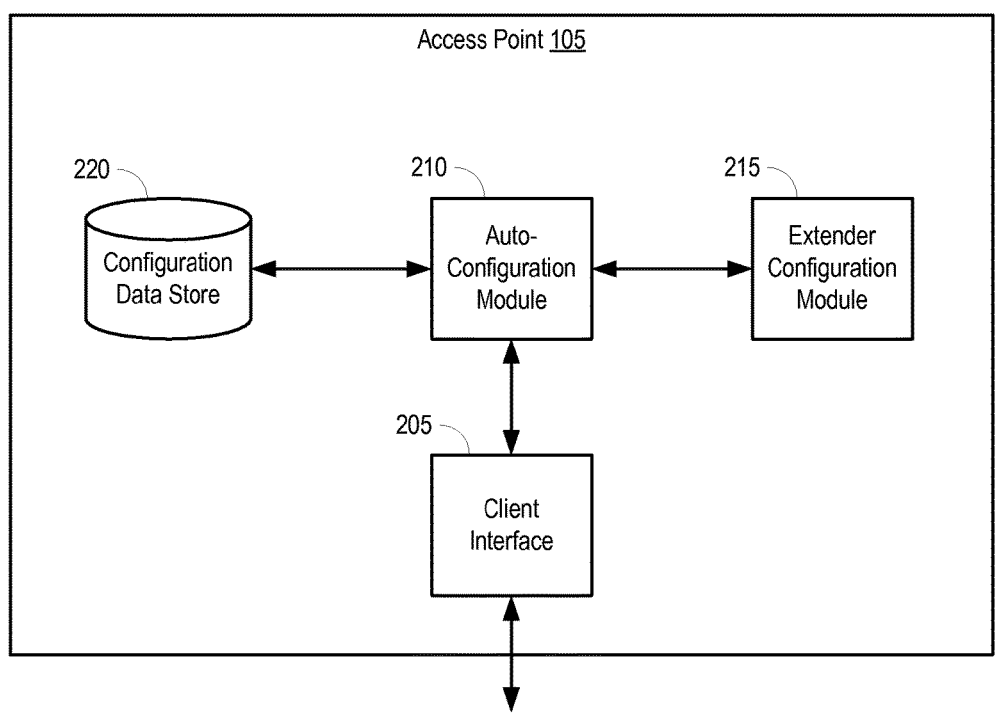
FIG. 2 is a block diagram illustrating an example access point operable to facilitate the automatic configuration of a network extender with wireless network parameters.

FIG. 2 is a block diagram illustrating an example access point 105 operable to facilitate the automatic configuration of a network extender with wireless network parameters. The access point 105 may include a client interface 205, an auto-configuration module 210, an extender configuration module 215, and a configuration data store 220.

In embodiments, the access point 105 may pass communications to and may receive communications from one or more client devices 110 of FIG. 1 or one or more network extenders 115 of FIG. 1 through a client interface 205. The client interface 205 may include a wireless interface configured to receive and to transmit wireless communications (e.g., 802.11 packet exchanges).

A network extender 115 may be configured with wireless network parameters that are associated with the access point 105 to provide one or more client devices 110 with access to a wireless network supported by the access point 105. The access point 105 (e.g., the auto-configuration module 210) may initiate an auto-configuration process periodically or conditionally. For example, the auto-configuration module 210 may initiate an auto-configuration process when a specific MIB or Web GUI command is received at the access point 105, after a network extender 115 power cycle or reset, and/or after a power cycle, reset or reboot of the access point 105.

In embodiments, the access point 105 may identify a network extender 115. The network extender 115 may be identified based upon a discovery message received from the network extender 115. Identification of a network extender may be accomplished through a universal plug-and-play (UPnP) discovery protocol such as the simple service discovery protocol (SSDP). For example, the discovery message may be an advertisement message that is output from the network extender 115 and received at the access point 105 through the client interface 205. As another example, the discovery message may be a search response message that is output from the network extender 115 as a result of receiving a search message from the access point 105.

In embodiments, a discovery message received from a network extender 115 at the access point 105 may include an identification of a network location (e.g., local or internal location at the network extender 115) associated with the network extender 115. For example, the discovery message may include a uniform resource locator (URL) associated with a UPnP description of the network extender 115. The discovery message may include a configuration number identifying the current set of configuration parameters that are applied at the network extender 115.

After a discovery message is received by the auto-configuration module 210 from a network extender 115, the auto-configuration module 210 may retrieve device description information associated with the identified network extender 115. For example, device description information may be retrieved from the network location (e.g., URL) identified within the discovery message. The network location from which device description information is retrieved may be a local or internal location at the network extender 115. Device description information associated with the network extender 115 may include vendor-specific manufacturer information such as a model name, model number, serial number, manufacturer name, URL(s) to vendor-specific web-sites, and others. For example, the auto-configuration module 210 may retrieve manufacturer name and model number of the identified network extender 115 from extensible markup language (XML) formatted device description information via a HTTP-GET message exchange. In embodiments, the device type field of the retrieved device description information may be modified according to predetermined settings at the access point 105. For example, the device type of an identified network extender 115 may be modified to a device type description indicating that the network extender 115 is an approved device.

In embodiments, device description information (e.g., manufacturer name and model number) associated with the network extender 115 may be compared to device description information included in a table at the access point 105 (e.g., at extender configuration module 215). For example, the extender configuration module 215 may include device description information associated with one or more devices that are configured for automatic wireless network parameter configuration with the access point 105. If the device description information associated with the identified network extender 115 matches device description information included within the extender configuration module 215, then the auto-configuration module 210 may proceed with the auto-configuration of the identified network extender 115 with wireless network parameters associated with the access point 105.

In embodiments, the access point 105 may be configured to allow any network extender 115 that successfully negotiates a push method (e.g., push button automatic configuration) to connect to the access point 105. For example, the list of devices (e.g., list stored at the extender configuration module 215) configured for auto-configuration with the access point 105 may be left empty.

In embodiments, if the determination is made that the network extender 115 supports an auto-configuration push from the access point 105, the access point 105 may initiate a client secure layer (e.g., HTTP-S) connection with the network extender 115 (e.g., with an HTTP-S server associated with the network extender 115). The secure layer connection may be initiated by the auto-configuration module 210. As part of the secure layer session establishment, the network extender 115 may output an associated SSL certificate to the access point 105. The access point 105 (e.g., the auto-configuration module 210) may authenticate the SSL certificate as valid using an SSL root certificate that is pre-provisioned at the access point 105. The SSL root certificate may be hard-coded into the access point 105 image or downloaded to the access point 105 via another method.

If the SSL certificate associated with the network extender 115 is authenticated, then the HTTP-S session between the access point 105 and the network extender 115 may be established. If authentication of the SSL certificate fails, then the access point 105 may terminate the auto-configuration of the network extender 115, and a MIB may be updated at the access point 105 indicating the failed attempt to authenticate the SSL certificate of the network extender 115.

In embodiments, security may be disabled at the access point 105 by configuring the access point 105 (e.g., via a MIB setting) not to require an authentication of a network extender 115 SSL certificate before attempting an auto-configuration with the network extender 115. When security is disabled at the access point 105, an HTTP session may be established between the access point 105 and the network extender 115 in place of an HTTP-S session.

When the secure layer session (or HTTP session) is established between the access point 105 and network extender 115, the auto-configuration module 210 may update the configuration of the network extender 115. In embodiments, configuration of the network extender 115 may be updated by outputting a message (e.g., HTTP-S PUT request) from the access point 105 to the network extender 115. For example, the HTTP-S PUT request may be output to the network location (e.g., URL or other location identifier associated with a local or internal location of the network extender 115) associated with the network extender 115. The content of the HTTP-S PUT may be formatted as XML and may include network extender 115 parameter data (e.g., MIB names and values or any other data model that may be formatted in XML) corresponding to wireless network parameters associated with the access point 105. The configuration updates may include various parameter settings such as configuration version, wireless mode, radio status, output power, beacon interval, service set identifier (SSID) information and others. Wireless parameter settings may be stored at the configuration data store 220. In embodiments, one or more of the MIB objects may be mapped to a corresponding SSID.

In embodiments, a discovery message (e.g., advertisement message or search response message) received from a network extender 115 at the access point 105 may include an identification of a current configuration that is applied at the network extender 115. Once the determination is made that the network extender 115 supports auto-configuration with the access point 105, the access point 105 may update a corresponding value in the configuration message (e.g., HTTP-S PUT) to represent the current configuration of the network extender 115. For example, the first time a specific network extender 115 is identified by the access point 105, the access point 105 may initialize the current configuration identifier to a predetermined value (e.g., last two (2) bytes of the access point 105 media access control (MAC) address) and the value may include a byte appended as a counter. The network extender 115 may use the last configuration identifier value set by the access point 105 on subsequent discovery messages (e.g., advertisement message or search response message). The access point 105 (e.g., auto-configuration module 210) may compare the configuration identifier value of a received discovery message to the last configuration identifier value stored for the network extender 115 to determine whether a configuration update is needed at the network extender 115. If the configuration identifier value received in the discovery message does not match the configuration identifier value stored at the access point 105, then a new configuration message may be output to the network extender 115 and an updated configuration identifier value may be stored at the access point 105 (e.g., counter may be incremented).

In embodiments, certain configuration parameters included in a configuration message (e.g., HTTP-S PUT request) may be identified within the configuration message as parameters that the network extender 115 may override the value included in the configuration message with a value that is specified for the network extender 115. For example, some parameter values implemented at the access point 105 may need to be implemented differently at the network extender 115 (e.g., output power, wireless channel, etc.).

In embodiments, if a receipt acknowledgment (e.g., "200 OK") is not received by the access point 105 from the network extender 115 in response to the configuration message (e.g., HTTP-S PUT request), then the access point 105 may re-attempt to deliver the configuration message to the network extender 115 up to a predetermined number of times. For example, the access point 105 may be limited to making three re-attempts, and a backoff duration associated with the re-attempts may be increased with each re-attempt (e.g., backoff duration of 1 second for a first re-attempt, backoff duration of 10 seconds for a second re-attempt, backoff duration of 30 seconds for a third re-attempt, etc.). A failure to receive a receipt acknowledgment may be indicated by a 4xx response, 5xx response, no response at all, and others. If the network extender 115 fails to successfully respond to the configuration message after the predetermined number of re-attempts, the access point 105 may update a MIB setting at the access point 105 indicating the failed attempt to automatically configure the network extender 115.

In embodiments, an access point 105 (e.g., at the auto-configuration module 210) may identify an auto-configuration failure at a network extender 115 based on a mismatching configuration identifier received from the network extender 115. For example, if a configuration identifier received from a network extender 115 (e.g., configuration identifier in a discovery message received after a reset/reboot of the network extender 115) does not match the corresponding configuration identifier as stored at the access point 105, the access point 105 may determine that the network extender 115 failed to update configuration parameters and may resend the configuration message. The access point 105 may be limited to resending configuration messages to a certain network extender 115 a predetermined number of times (e.g., 10-15 attempts) over a predetermined duration (e.g., 30-60 minutes). If the predetermined number of attempts to resend the configuration message is reached, the access point 105 may refrain from making any further attempts to configure the network extender 115 until there is a configuration change at the access point 105 that would require a configuration update to the network extender 115.

After a network extender 115 is discovered by the access point 105 and an initial HTTP-S PUT message exchange has been completed between the access point 105 and the network extender 115, the network extender 115 may establish a secure channel such that subsequent configuration updates may be delivered to the network extender 115 (e.g., as HTTP-S PUTs). In embodiments, a network extender flag may be maintained and set at the access point 105 when a relevant parameter (e.g., MIB value or other data parameter) is updated on the access point 105 that is also applicable to the configuration setting of a network extender 115. The access point 105 may output configuration updates to each of one or more network extenders 115 that are identified as having configuration settings applicable to a parameter update taking place at the access point 105. In embodiments, the access point 105 may retrieve a current configuration setting at a network extender 115 using HTTP-S GET message exchanges.

Status and configuration information associated with one or more network extenders 115 may be maintained at the access point 105 (e.g., at the configuration data store 220) for a predetermined period of time. For example, after a certain network extender 115 has not been seen by the access point 105 for a certain duration of time (e.g., 3-6 days), the status and configuration information associated with then network extender 115 may be removed from a table stored at the configuration data store 220.

Figure 3:
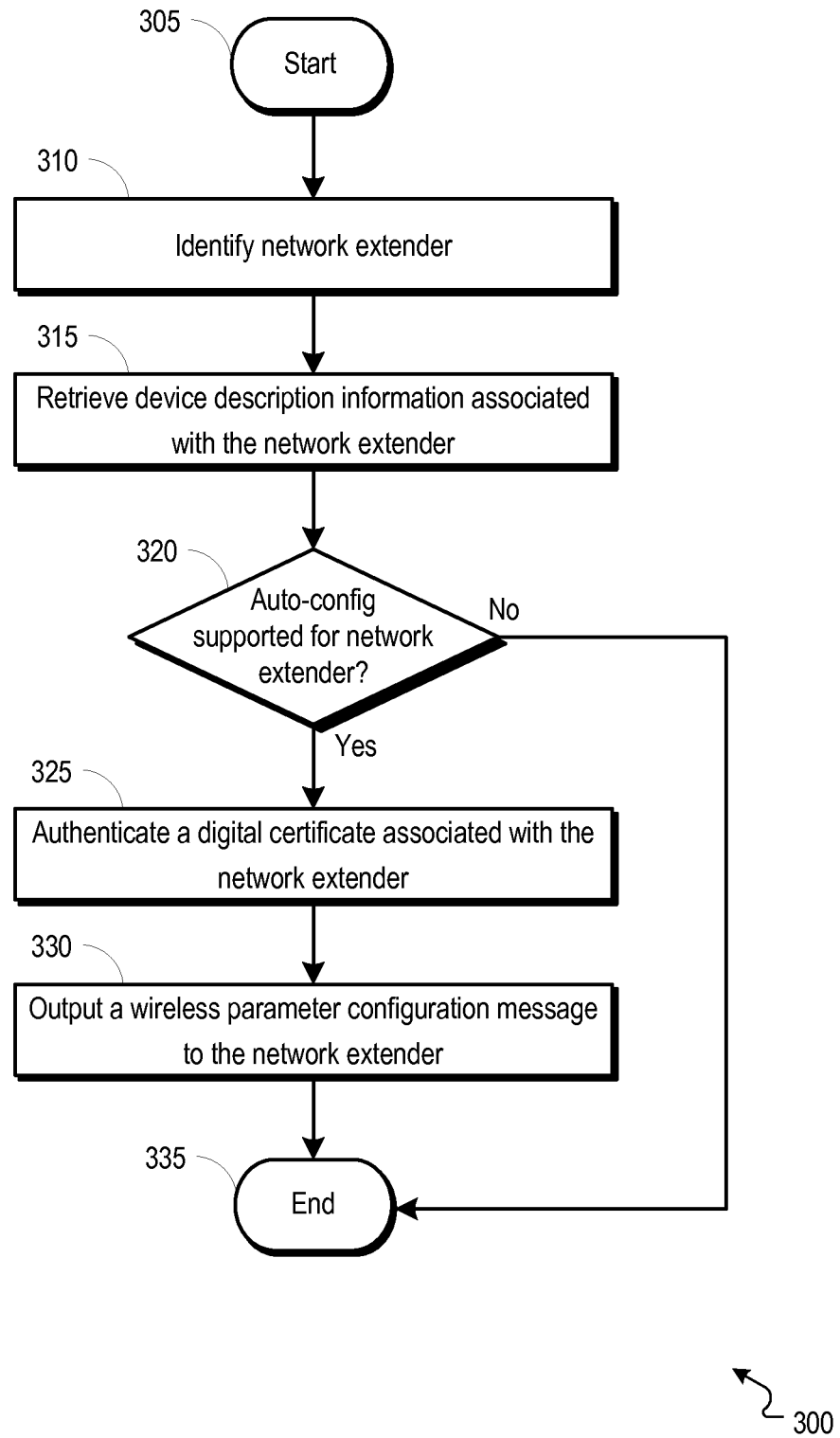
FIG. 3 is a flowchart illustrating an example process operable to facilitate the automatic configuration of a network extender with wireless network parameters.

FIG. 3 is a flowchart illustrating an example process 300 operable to facilitate the automatic configuration of a network extender with wireless network parameters. The process 300 may begin at 305 when an auto-configuration triggering event occurs. An auto-configuration triggering event may include a power cycle at a network extender 115 of FIG. 1, a reset of a network extender 115, a power cycle at an access point 105 of FIG. 1, a reset of the access point 105, a reboot of the access point 105, a reception of an auto-configuration initiation command (e.g., command received as a management information base (MIB) or web graphical user interface (WebGUI) command), or any other event causing the initiation of an auto-configuration of a network extender 115. The auto-configuration process may be initiated by an access point 105.

At 310, a network extender 115 may be identified. The network extender 115 may be identified, for example, by an access point 105 of FIG. 1 (e.g., at an auto-configuration module 210 of FIG. 2). The network extender 115 may be identified based on a device search carried out by the access point 105 or may be identified based on a message received from the network extender 115. For example, the network extender 115 may be identified through a universal plug-and-play (UPnP) discovery protocol (e.g., simple service discovery protocol (SSDP)).

A network extender 115 may be identified by an access point 105 when the access point 105 receives an advertisement message (e.g., UPnP advertisement) from the network extender 115. The advertisement message may include information identifying a network location of the network extender 115. The network location associated with the network extender 115 may be a local or internal location of the network extender 115.

In embodiments, the access point 105 may output a search message, and in response to receiving the search message, a network extender 115 may output a response message to the access point 105. The response message may include information identifying the network location (e.g., location of a local or internal server at the network extender 115) of the network extender 115. The output of a search message from the access point 105 may occur periodically or may be manually triggered by a user (e.g., via a MIB).

At 315, device description information associated with the identified network extender 115 may be retrieved. Device description information may be retrieved, for example, by an access point 105 of FIG. 1 (e.g., at an auto-configuration module 210 of FIG. 2). In embodiments, device description information may be retrieved from a uniform resource locator (URL) (e.g., local or internal location at the network extender 115) that is provided within a message received from the network extender (e.g., network location information included in an advertisement message or search response message). For example, the access point 105 may retrieve device description information (e.g., as extensible markup language (XML) formatted data) from the URL associated with the network extender 115 through a HTTP-GET message exchange. The retrieved device description information may include vendor-specific manufacturer information such as model name, model number, serial number, manufacturer name, URL to vendor-specific web sites, and other information.

At 320, a determination may be made whether auto-configuration is supported for the identified network extender 115. The determination whether auto-configuration is supported for the identified network extender 115 may be made, for example, by an access point 105 of FIG. 1 (e.g., at an auto-configuration module 210 of FIG. 2). In embodiments, a list of devices that are configured for auto-configuration with the access point 105 may be stored at the access point 105 (e.g., at the extender configuration module 215 of FIG. 2). For example, device description information (e.g., model name, model number, serial number, manufacturer name, etc.) associated with each device configured for auto-configuration with the access point 105 may be stored at the access point 105. The auto-configuration module 210 may compare retrieved device description information associated with the identified network extender 115 to the device description information stored at the extender configuration module 215, and if the retrieved device description information matches with device description information stored at the extender configuration module 215, the determination may be made that the identified network extender 115 is configured for auto-configuration with the access point 105.

In embodiments, the access point 105 may be configured to allow any device to attempt an auto-configuration with the access point 105. For example, a network extender 115 may be automatically configured with the access point 105 if the network extender 115 successfully navigates a connection with the access point 105 via a push method (e.g., automatic push button configuration).

If, at 320, the determination is made that the network extender 115 is configured for auto-configuration with the access point 105, the process 300 may proceed to 325. At 325, a digital certificate associated with the network extender may be authenticated. In embodiments, the access point 105 may initiate a secure connection (e.g., HTTP-S) with the network extender 115 (e.g., the HTTP-S server associated with the network extender 115), and the network extender 115 may output a digital certificate (e.g., server secure sockets layer (SSL) certificate). The access point 105 may receive the digital certificate from the network extender 115 and may authenticate the digital certificate as valid using a SSL root certificate that is pre-provisioned at the access point 105. For example, the SSL root certificate may be hard-coded into the access point 105 image or may be otherwise downloaded to the access point 105.

At 330, a wireless parameter configuration message may be output to the network extender. The wireless parameter configuration message may be generated at an access point 105 by an auto-configuration module 210 and the wireless parameter configuration message may be output through a client interface 205. In embodiments, the wireless parameter configuration message may be a HTTP-S PUT request that includes XML formatted content containing parameter data (e.g., MIB names and values or any other data model that may be formatted in XML) corresponding to wireless network parameters (e.g., wireless mode, radio status, output power, beacon interval, SSID information, regulatory domain, channel, operating standards, channel bandwidth, SSID security related parameters, quality of service (QoS) settings, maximum associated devices, etc.) that are to be configured on the network extender 115. In embodiments, wireless network parameters included in the wireless parameter configuration message may be parameters associated with each of one or more service sets that are configured at the access point. After outputting the wireless parameter configuration message to the network extender, the process 300 may end at 335. It should be understood that a parameter configuration message may be transmitted to the network extender using any of a variety of communication technologies (e.g., MoCA, 802.11, G.hn, HomePlug AV (HPAV), HPAV2, Bluetooth, Zigbee, Zwave, etc.)

Returning to 320, if the determination is made that auto-configuration is not supported for the identified network extender, the process 300 may end at 335.

Figure 4:
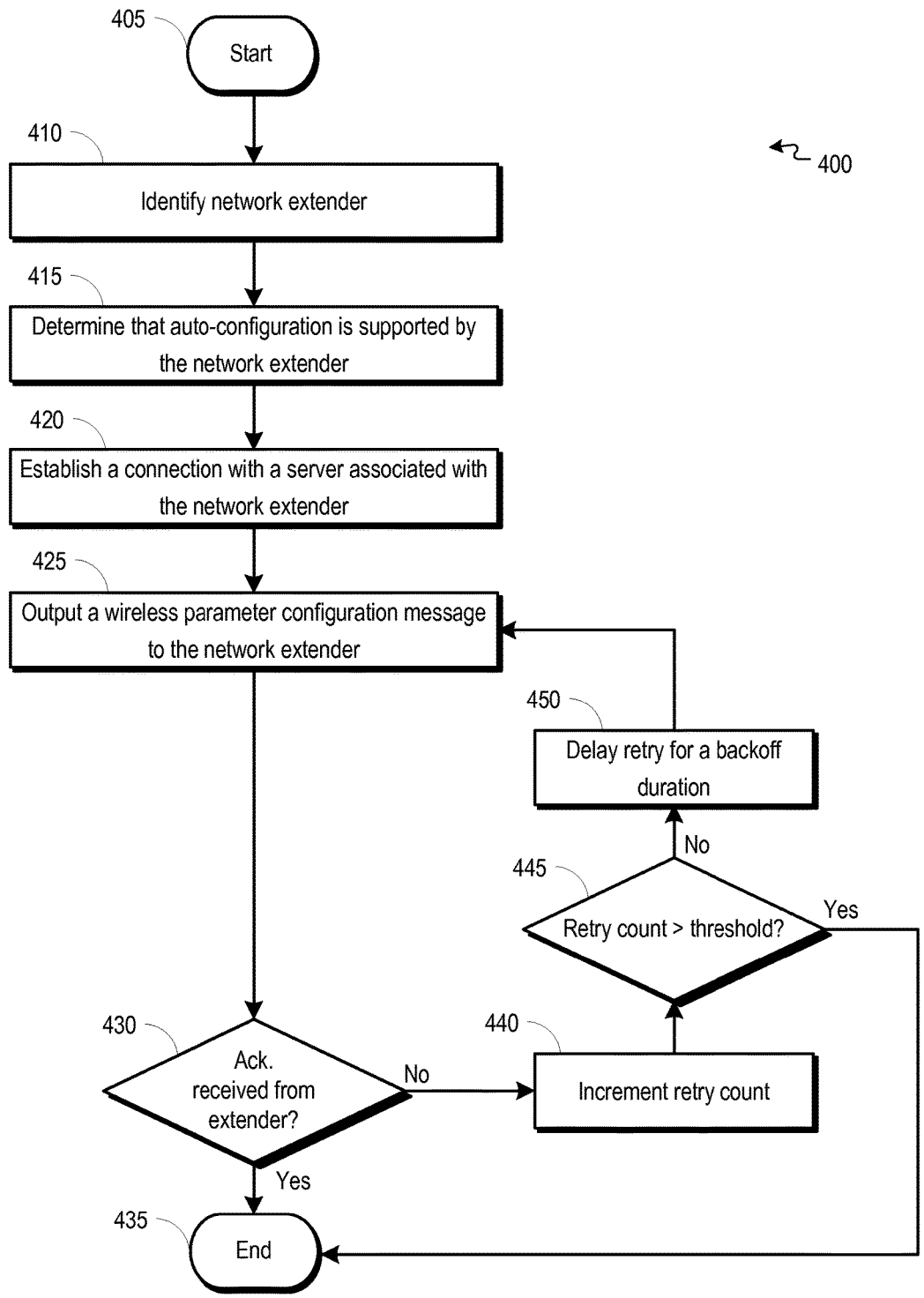
FIG. 4 is a flowchart illustrating an example process operable to facilitate the confirmation of an automatic configuration of a network extender with wireless network parameters.

FIG. 4 is a flowchart illustrating an example process 400 operable to facilitate the confirmation of an automatic configuration of a network extender with wireless network parameters. The process 400 may begin at 405 when an auto-configuration triggering event occurs. An auto-configuration triggering event may include a power cycle at a network extender 115 of FIG. 1, a reset of a network extender 115, a power cycle at an access point 105 of FIG. 1, a reset of the access point 105, a reboot of the access point 105, a reception of an auto-configuration initiation command (e.g., command received as a management information base (MIB) or web graphical user interface (WebGUI) command), or any other event causing the initiation of an auto-configuration of a network extender 115. The auto-configuration process may be initiated by an access point 105.

At 410, a network extender 115 may be identified. The network extender 115 may be identified, for example, by an access point 105 of FIG. 1 (e.g., at an auto-configuration module 210 of FIG. 2). The network extender 115 may be identified based on a device search carried out by the access point 105 or may be identified based on a message received from the network extender 115. For example, the network extender 115 may be identified through a universal plug-and-play (UPnP) discovery protocol (e.g., simple service discovery protocol (SSDP)).

A network extender 115 may be identified by an access point 105 when the access point 105 receives an advertisement message (e.g., UPnP advertisement) from the network extender 115. The advertisement message may include information identifying the network location of the network extender 115. The identified network location may be a local or internal location at the network extender 115.

In embodiments, the access point 105 may output a search message, and in response to receiving the search message, a network extender 115 may output a response message to the access point 105. The response message may include information identifying the network location (e.g., local or internal location of a server associated with the network extender 115) of the network extender 115. The output of a search message from the access point 105 may occur periodically or may be manually triggered by a user (e.g., via a MIB).

At 415, the determination may be made that auto-configuration is supported by the network extender. The determination that auto-configuration is supported by the network extender may be made, for example, by an access point 105 of FIG. 1 (e.g., at an auto-configuration module 210 of FIG. 2). In embodiments, the auto-configuration module 210 may compare retrieved device description information (e.g., vendor-specific manufacturer information such as model name, model number, serial number, manufacturer name, URL to vendor-specific web sites, and other information) associated with the identified network extender 115 to device description information stored at the access point 105 (e.g., at extender configuration module 215), and if the retrieved device description information matches with device description information stored at the access point 105, the determination may be made that the identified network extender 115 is configured for auto-configuration with the access point 105. In embodiments, 415 may be skipped and the access point 105 may be configured to allow any device to attempt an auto-configuration with the access point 105.

At 420, a connection (e.g., HTTP) may be established between the access point 105 and the identified network extender 115. For example, the connection established between the access point 105 and the identified network extender 115 may be a secure connection (e.g., HTTP-S) with a server (e.g., HTTP-S server) associated with the network extender 115 (e.g., internal or local server at the network extender 115). The network extender 115 may output a digital certificate (e.g., server secure sockets layer (SSL) certificate) to the access point 105, and the access point 105 may authenticate the digital certificate as valid using a SSL root certificate that is pre-provisioned at the access point 105. For example, the SSL root certificate may be hard-coded into the access point 105 image or may be otherwise downloaded to the access point 105.

At 425, a wireless parameter configuration message may be output to the network extender. The wireless parameter configuration message may be generated at an access point 105 by an auto-configuration module 210 and the wireless parameter configuration message may be output through a client interface 205. In embodiments, the wireless parameter configuration message may be a HTTP-S PUT request that includes XML formatted content containing parameter data (e.g., MIB names and values or any other data model that may be formatted in XML) corresponding to wireless network parameters (e.g., wireless mode, radio status, output power, beacon interval, SSID information, regulatory domain, channel, operating standards, channel bandwidth, SSID security related parameters, quality of service (QoS) settings, maximum associated devices, etc.) that are to be configured on the network extender 115.

At 430, a determination may be made whether an acknowledgement message is received at the access point 105 from the network extender 115. An access point 105 may expect to receive an acknowledgement message from the network extender 115 in response to the wireless parameter configuration message, the acknowledgement message confirming receipt of the wireless parameter configuration message by the network extender 115. In embodiments, reception of an error message from the network extender 115 may be considered as a failure to receive an acknowledgement message from the network extender 115. If the acknowledgment message is received at the access point 105 from the network extender 115, the process 400 may end at 435.

If, at 430, the acknowledgment message is not received at the access point 105 from the network extender 115, the process 400 may proceed to 440. At 440, a configuration retry count may be incremented. In embodiments, a configuration retry count may be maintained at the access point 105, and the configuration retry count may provide an indication of the number of attempts made by the access point 105 to successfully deliver configuration information (e.g., wireless parameter configuration message) to a specific network extender 115. For example, after each failed attempt to deliver a wireless parameter configuration message to a network extender 115 (e.g., access point 105 fails to receive acknowledgement message in response to an output of a wireless parameter configuration message), the configuration retry count for the network extender 115 may be incremented.

At 445, a determination may be made whether the configuration retry count for the network extender 115 is greater than a threshold. For example, after a threshold number (e.g., 3, 4, 5, etc.) of configuration attempts, the access point 105 may terminate the auto-configuration process with the network extender. If the determination is made that the retry count is greater than a threshold, the process 400 may end at 435 and the access point 105 may update auto-configuration settings (e.g., MIBs) to indicate the failed auto-configuration attempt with the network extender 115.

If, at 445, the determination is made that the configuration retry count is not greater than a threshold, the process 400 may proceed to 450. At 450, a subsequent attempt to output configuration information (e.g., wireless parameter configuration message) to the network extender 115 may be delayed for a backoff duration. In embodiments, the backoff duration may be based on the configuration retry count. For example, with each increment of the configuration retry count, the corresponding backoff duration may be increased (e.g., the backoff duration may be one (1) second for a first retry, ten (10) seconds for a second retry, thirty (30) seconds for a third retry, etc.). After the expiration of the backoff duration, a wireless parameter configuration message may be output to the network extender at 425.

Figure 5:
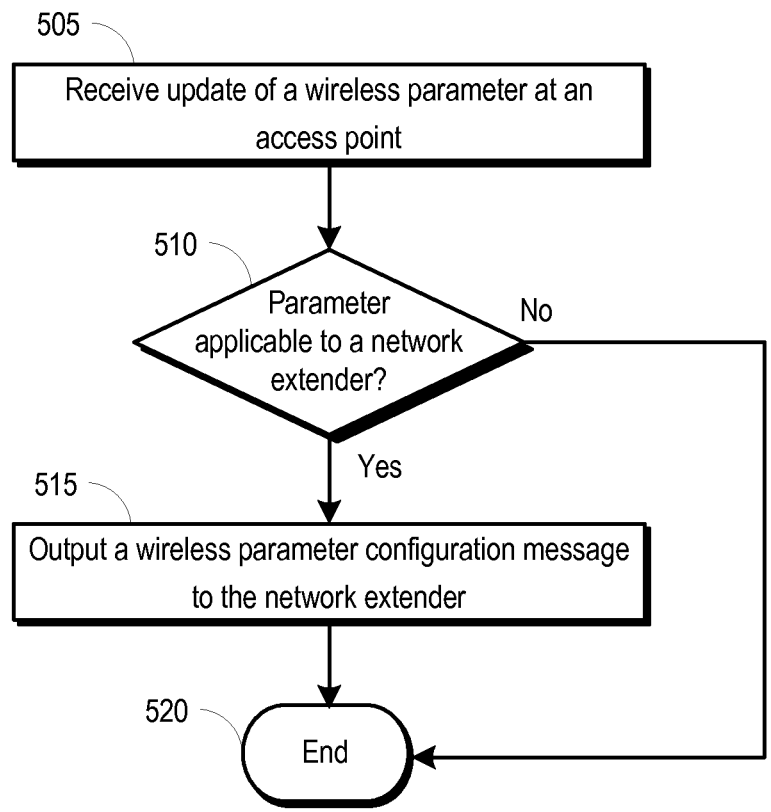
FIG. 5 is a flowchart illustrating an example process operable to facilitate the automatic update to wireless network parameters at a network extender.

FIG. 5 is a flowchart illustrating an example process 500 operable to facilitate the automatic update to wireless network parameters at a network extender. The process 500 may begin at 505 when an update to wireless parameters is received at an access point 105 of FIG. 1. In embodiments, a wireless parameter may be updated at an access point 105, and the update may be made to a MIB value associated with the wireless parameter.

At 510, a determination may be made whether a parameter applicable to a network extender 115 of FIG. 1 is updated at the access point 105. The determination whether a parameter applicable to a network extender 115 is updated at the access point 105 may be made, for example, by an auto-configuration module 210 of FIG. 2. In embodiments, a flag associated with a network extender 115 may be set when a relevant parameter (e.g., MIB value or other data parameter) is updated at the access point 105 that also applies to a network extender 115 configuration setting.

If, at 510, the determination is made that a parameter applicable to a network extender 115 is updated at the access point 105, the process 500 may proceed to 515. At 515, a wireless parameter configuration message may be output to the network extender. The wireless parameter configuration message may be generated at an access point 105 by an auto-configuration module 210 and the wireless parameter configuration message may be output through a client interface 205 to a network extender. In embodiments, the wireless parameter configuration message may be a HTTP-S PUT request that includes XML formatted content containing parameter data (e.g., MIB names and values or any other data model that may be formatted in XML) corresponding to wireless network parameters (e.g., wireless mode, radio status, output power, beacon interval, SSID information, regulatory domain, channel, operating standards, channel bandwidth, SSID security related parameters, quality of service (QoS) settings, maximum associated devices, etc.) that are to be configured on the network extender 115. For example, the MIB names and values may include those MIB names and values that have been updated at the access point 105 and that are applicable to the network extender 115. After the wireless parameter configuration message is output to the network extender 115, the process 500 may end at 520.

If, at 510, the determination is made that there are no parameters applicable to a network extender 115 that are updated at the access point 105, the process 500 may end at 520.

Figure 6:
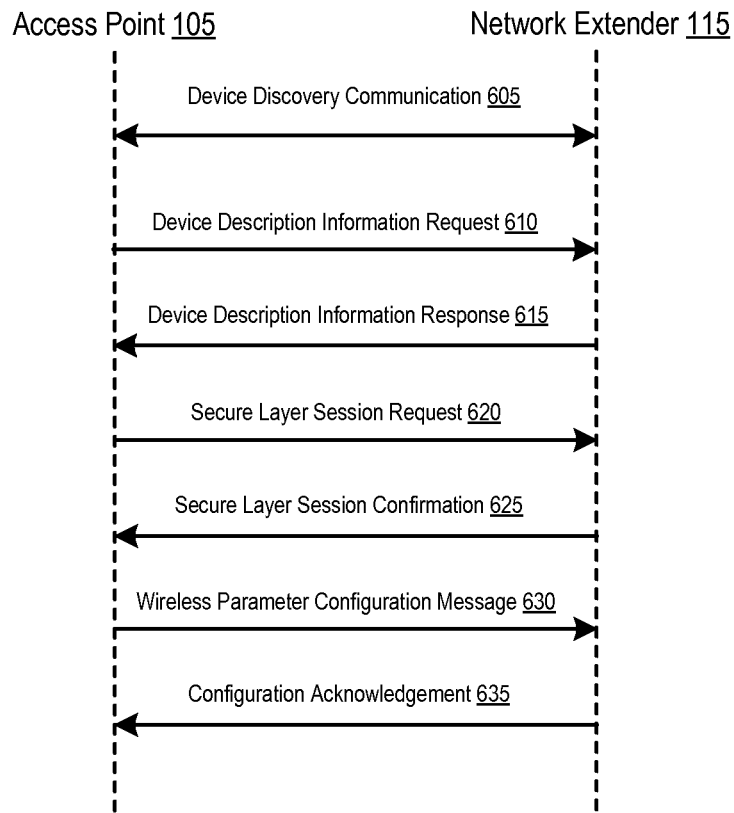
FIG. 6 is a communication flow diagram showing communications that may facilitate an automatic configuration of a network extender with wireless network parameters.

FIG. 6 is a communication flow diagram 600 showing communications that may facilitate an automatic configuration of a network extender with wireless network parameters. An access point 105 may identify a network extender 115 through one or more device discovery communications 605. For example, a device discovery communication 605 may include an advertisement message (e.g., UPnP advertisement) that is received at the access point 105 from the network extender 115, or may include a search message output from the access point 105 and a search response message output from the network extender 115 to the access point 105 in response to the search message. In embodiments, the device delivery communication 605 may include information identifying the network location of the network extender 115. The network location of the network extender 115 may be a local or internal location at the network extender 115.

Once a network extender 115 is identified by the access point 105, the access point 105 may output a device description information request 610. In embodiments, the device description information request 610 may be output to a server associated with the network extender 115 (e.g., a local or internal server at the network extender 115), wherein the server location (e.g., URL) is identified in the device discovery communication 605 received at the access point 105. For example, the device description information request 610 may be an HTTP-GET message.

In response to the device description information request 610, a device description information response 615 may be received at the access point 105. The device description information response 615 may include an HTTP acknowledgement message including information such as device model name, model number, serial number, manufacturer name, URL to vendor-specific web sites, and other information. The information carried by the device description information response 615 may be delivered as XML formatted data.

In embodiments, a secure layer session request 620 may be output from the access point 105 to the network extender 115. The secure layer session request 620 may initiate a secure layer session (e.g., secure sockets layer (SSL) session, transport layer security (TLS) session, etc.) between the access point 105 and network extender 115.

In embodiments, a secure layer session confirmation 625 may be output from the network extender 115 to the access point 105 and may provide confirmation of a successful HTTP-S connection between the network extender 115 and access point 105. The secure layer session confirmation 625 may be based on an authentication of a digital certificate associated with the network extender 115. For example, the access point 105 may receive the digital certificate from the network extender 115 and may authenticate the digital certificate as valid using a SSL root certificate that is pre-provisioned at the access point 105.

After a secure layer session is established between the access point 105 and the network extender 115, the access point 105 may output a wireless parameter configuration message 630 to the network extender 115. In embodiments, the wireless parameter configuration message 630 may be a HTTP-S PUT request that includes XML formatted content containing parameter data (e.g., MIB names and values or any other data model that may be formatted in XML) corresponding to wireless network parameters (e.g., wireless mode, radio status, output power, beacon interval, SSID information, regulatory domain, channel, operating standards, channel bandwidth, SSID security related parameters, quality of service (QoS) settings, maximum associated devices, etc.) that are to be configured on the network extender 115.

After the wireless parameter configuration message 630 is received at the network extender 115, the network extender 115 may output a configuration acknowledgement 635 to the access point 105. The configuration acknowledgment 635 may be a HTTP acknowledgement message providing an indication to the access point 105 that the wireless parameter configuration message 630 has been received by the network extender 115.

Figure 7:
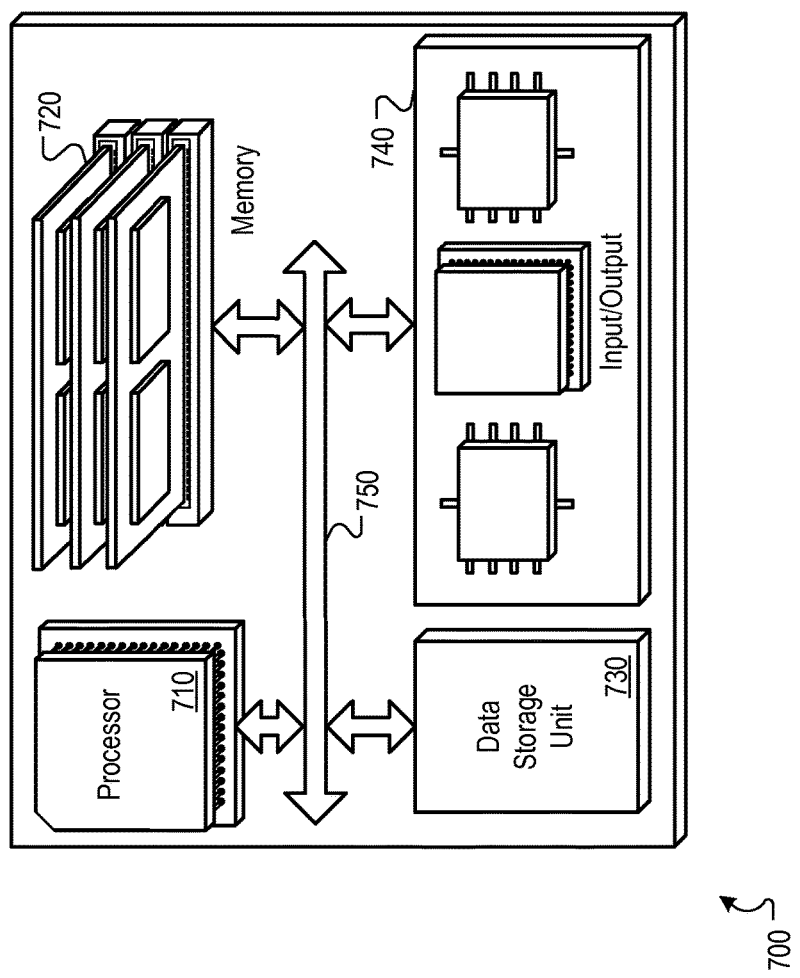
FIG. 7 is a block diagram of a hardware configuration operable to facilitate an automatic configuration of a network extender with wireless network parameters.

FIG. 7 is a block diagram of a hardware configuration 700 operable to facilitate an automatic configuration of a network extender with wireless network parameters. It should be understood that the hardware configuration 700 can exist in various types of devices. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In embodiments, the input/output device 740 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more devices within a subscriber premise (e.g., client device 110 of FIG. 1, network extender 115 of FIG. 1, etc.) and/or one or more networks (e.g., subscriber network 125 of FIG. 1, WAN 120 of FIG. 1, local network, etc.).

Those skilled in the art will appreciate that the invention improves upon methods and apparatuses for configuring a network extender. Methods, systems, and computer readable media may be operable to facilitate the automatic configuration of a network extender with network parameters. An access point may identify a network extender and may determine whether the identified network extender is configured for an automatic configuration of network parameters based upon device description information retrieved during the identification of the network extender. The access point may output a configuration message to the identified network extender, the configuration message including one or more parameters associated with a network provided by the access point, and the network extender may apply the one or more parameters. The access point may periodically or conditionally provide the network extender with updates to the network parameters.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method for configuration of a network extender by an access point, the method comprising:
    receiving a message from the network extender, wherein the message identifies the network extender to the access point, and wherein the message comprises information identifying a network location of the network extender, wherein the network extender is associated with a server, and wherein the server comprises an HTTP-S server;
    based upon the received message, determining the network location of the network extender;
    establishing a secure connection between the access point and the network extender;
    receiving a server secure sockets layer (SSL) certificate at the access point, wherein the SSL certificate is received from the network extender;
    authenticating the digital certificate as valid using a SSL root certificate that is pre-provisioned at the access point;
    outputting a configuration message to the server associated with the network extender, wherein the configuration message comprises one or more network parameters; and
    wherein the access point does not receive an acknowledgement message from the network extender in response to the output of the configuration message, outputting one or more subsequent configuration messages to the server associated with the network extender.

2. The method of claim 1, wherein the message received from the network extender comprises an advertisement message.

3. The method of claim 1, further comprising:
    outputting a search message from the access point; and
    wherein the message received from the network extender comprises a search response message.

4. The method of claim 1, further comprising:
    retrieving device description information associated with the network extender; and
    determining that the network extender supports automatic configuration based upon a comparison of the device description information associated with the network extender to device description information identifying one or more devices that support automatic configuration.

5. The method of claim 1, wherein the one or more network parameters comprise parameters associated with one or more service sets that are configured at the access point.

6. The method of claim 1, wherein the one or more network parameters comprise parameters that, when applied at the network extender, allow the network extender to pass communications between a client device and the access point.

7. The method of claim 1, further comprising:
    receiving an update to one or more network parameters at the access point; and
    outputting a subsequent configuration message to the server associated with the network extender, wherein the subsequent configuration message comprises the updated one or more network parameters.

8. One or more non-transitory computer readable media having instructions operable to cause one or more processors to perform the operations comprising:
    receiving a message from a network extender, wherein the message identifies the network extender to an access point, and wherein the message comprises information identifying a network location of the network extender, wherein the network extender is associated with a server, and wherein the server comprises an HTTP-S server;

based upon the received message, determining the network location of the network extender;

establishing a secure connection between the access point and the server associated with the network extender;

receiving a server secure sockets layer (SSL) certificate at the access point, wherein the SSL certificate is received from the network extender;

authenticating the digital certificate as valid using a SSL root certificate that is pre-provisioned at the access point; and outputting a configuration message to the server associated with the network extender, wherein the configuration message comprises one or more network parameters; and wherein the access point does not receive an acknowledgement message from the network extender in response to the output of the configuration message, outputting one or more subsequent configuration messages to the server associated with the network extender.

9. The one or more non-transitory computer-readable media of claim 8, wherein the message received from the network extender comprises an advertisement message.

10. The one or more non-transitory computer-readable media of claim 8, wherein the instructions are further operable to cause one or more processors to perform the operations comprising:

outputting a search message from the access point; and wherein the message received from the network extender comprises a search response message.

11. The one or more non-transitory computer-readable media of claim 8, wherein the instructions are further operable to cause one or more processors to perform the operations comprising:

retrieving device description information associated with the network extender;

determining that the network extender supports automatic configuration based upon a comparison of the device description information associated with the network extender to device description information identifying one or more devices that support automatic configuration.

12. The one or more non-transitory computer-readable media of claim 8, wherein the one or more network parameters comprise parameters associated with one or more service sets that are configured at the access point.

13. The one or more non-transitory computer-readable media of claim 8, wherein the instructions are further operable to cause one or more processors to perform the operations comprising:

receiving an update to one or more network parameters at the access point; and outputting a subsequent configuration message to the server associated with the network extender, wherein the subsequent configuration message comprises the updated one or more network parameters.

* * * * *